(12) United States Patent
Haridas et al.

(10) Patent No.: US 6,696,284 B2
(45) Date of Patent: Feb. 24, 2004

(54) BIOLOGICAL FILTER FOR THE PURIFICATION OF WASTE GASES

(75) Inventors: Ajit Haridas, Kerala (IN); Swachchha Majumdar, Kerala (IN)

(73) Assignee: Council of Scientific and Industrial Research, New Delhi (IN)

(*) Notice: Subject to any disclaimer, the term of this patent is extended or adjusted under 35 U.S.C. 154(b) by 113 days.

(21) Appl. No.: 09/983,224

(22) Filed: Oct. 23, 2001

(65) Prior Publication Data

US 2003/0082794 A1 May 1, 2003

(51) Int. Cl.[7] .............................. A61L 9/01; C12M 1/12
(52) U.S. Cl. ................ 435/266; 435/295.3; 435/297.1; 96/12; 96/108; 96/154; 210/150; 210/290; 210/631
(58) Field of Search .............................. 435/266, 295.3, 435/297.1; 210/150, 151, 290, 631; 96/12, 108, 154

(56) References Cited

U.S. PATENT DOCUMENTS

| | | | | |
|---|---|---|---|---|
| 5,269,925 A | * | 12/1993 | Broadhurst | ................. 210/488 |
| 5,626,763 A | * | 5/1997 | Mathews | ..................... 210/660 |
| 5,747,331 A | * | 5/1998 | Hartikainen et al. | ........ 435/266 |
| 6,100,081 A | * | 8/2000 | Buelna | ........................ 435/266 |
| 6,406,882 B1 | * | 6/2002 | Kumar et al. | ................. 435/42 |
| 6,408,568 B1 | * | 6/2002 | Kusey et al. | .................... 47/9 |

FOREIGN PATENT DOCUMENTS

| | | |
|---|---|---|
| DE | 42 35 591 A | 11/1993 |
| DE | 296 13 509 U | 1/1997 |
| DE | 199 28 087 A | 12/2000 |
| JP | 05309226 A * | 11/1993 ................. 422/122 |
| WO | WO 93 24205 A | 12/1993 |

OTHER PUBLICATIONS

Sudhira et al., Reuse of Byproducts in the Coir Industry: A Case Study, Oct. 14, 2000, Internet Conference on Material Flow Analysis of Integrated Bio–Systems, Abstract.*

* cited by examiner

Primary Examiner—David A. Redding
(74) Attorney, Agent, or Firm—Nixon & Vanderhye PC (57) ABSTRACT

The present invention relates to a biological filter for the purification of waste gases comprising a bed of biologically active carrier material consisting of pith extracted from coconut husks, the bed being contained such that the waste gases are brought in contact with the said bed and removed from the bed at points spatially separated from the inlet points.

20 Claims, 4 Drawing Sheets

BIOLOGICAL FILTER FOR THE PURIFICATION OF WASTE GASES

FIELD OF THE INVENTION

This invention relates to a biological filter for the purification of waste gases and to the purification of air or gas streams containing odorous or toxic compounds by passage through a porous solid media containing micro-organisms which convert the contaminant compounds to oxidised products, thereby effecting the desired purification. This invention, more particularly, relates to passing contaminated air through a bioactive biofilter media comprising retted coconut pith and coconut fibre, and to the selection, preparation and arrangement of the media. The invention achieves superior performance as a biofilter by enabling the adjustment of the pressure drop to a desired value, by providing adequate water retention, by providing a conducive environment for microbial growth, by using constituents which are natural, stable and environmentally compatible, by reducing the cost of media media, and by reducing the cost of transportation media.

BACKGROUND OF THE INVENTION

Biofilter systems are used in the purification of air streams. Biofilter systems have been applied for removal of odorous and toxic compounds in a wide variety of situation (Ottengraph S.S.P., Exhaust gas purification, Chapter 12, Biotechnology Vol. 8, Verlagsgesellschafi, Wienheim, 1986: VDI Guidelines No: 3477 —"Biofilter", Verein Deutscher Ingenieure, Dusseldorf 1991). During the passage of air through the biofilter, micro-organisms such as bacteria and fungi which are active on the biofilter media, oxidise the toxic and odour substances present in the air stream to carbon dioxide water and mineral products such as mineral acids depending on the chemical constitution of the contaminant. The biofilter media is a critical component of the system providing physical support, moisture and nutrients for the microorganisms while ensuring sufficient contact with gases at low pressure drop. In this invention, the removal of odour and toxics from air is achieved by passing air through a biofilter comprising retted coconut pith and coir fibre.

In general, two types of materials have been used in biofilter processes—natural materials such as biocompost, peat, fibrous peat, and porous clays or synthetic materials such as plastics. The use of natural organic materials usually provides the nutrients required to support growth of micro-organisms. The use of synthetic materials requires continuous addition of nutrients but allows better control of operation by facilitating the removal of acidity and degradation products. This invention falls in the category of natural material biofilters and one aspect of this invention relates to the selection, preparation and arrangement of the bed. There are only a few disclosures in the prior art regarding the selection and preparation of biofilter carrier material and formation of a biofilter bed.

Reference may be made to U.S. Pat. No. 5,578,114 dated Nov. 26, 1996, granted on Oude Luttighuis wherein a biological filter with a palletized biologically active compost carrier material is disclosed. Here, compost material is formed into balls 1 to 30 mm diameter, using water and thereafter drying the pellets. The object of the invention seems to be to reduce pressure drop. While this object is achieved, the invention fails to provide intimate gas contact with the whole of the carrier, as gas will pass through the space between the balls. Thus, the invention adversely affects the main object of a biofilter because the reaction between gas and active carrier media will be retarded as a result of poor mass transfer. This is also evident from the rather poor elimination capacity of ethyl acetate contaminant, in the example quoted therein, particularly and simpler to degrade than other common volatile organic compounds such as toluene, the removal of which is a common biofilter application.

It is disclosed in EP0142872 dated Jan. 27, 1988, that the addition of inert materials such as polyethylene, polystyrene, ground automobile tyres, volcanic lava, perlite and such inert materials, with a diameter of 3 to 10 mm can reduce the resistance to flow of gas through a biofilter compost bed. These materials are claimed to prevent shrinkage cracks as a result of differential drying that could take place in the bed. The claim appears to be based on the rigidity and inertness of the additional material added. The proportion of this inert material is 50% to 70% by volume. It is noted that these materials, being rigid, substantially spherical (certainly not fibrous), non-porous and water repelling are thus generally non-active. They support very low numbers of microorganisms and therefore reduce the useful volume of the biofilter.

Thus, the elimination capacity per unit volume of a biofilter is reduced by the volume of the inert additives. In practice, it is seen that mainly polystyrene balls are used as additive, because of its low weight, in commercial applications provided by the assignee of the above patent (Reference: http://www.clairtech.com). It is noted further, that the large volume of polystyrene added to compost makes the spent biofilter media environmentally unacceptable, and incurs disposal costs.

EP 413658B1 Beerli. Marc; Dec. 7, 1994; discloses a method for the preparation of peat beads which are applied to biofilters wherein the carrier material is pelletised with humidified turf as a binder. This again suffers the same disadvantages as with U.S. Pat. No. 5,578,114.

OBJECTS OF THE INVENTION

The main object of the present invention to provide an environmentally friendly inexpensive and highly effective biofilter for deodourisation and detoxification of air.

It is another object of the present invention to provide a biofilter for deodourisation of air utilizing biofilter system where pressure loss during passage of air is low and where the pressure loss may be adjusted as required by the addition of a bulking agent without compromising the elimination capacity per unit volume of the biofilter.

It is yet another object of this invention to provide a biofilter for deodourisation of air, which is able to retain and provide large moisture content for support of growth of micro-organisms.

It is yet another object of this invention to develop a new application for an agrowaste which, at present, incurs disposal costs.

All the above objects are achieved by the formulation of a biofilter bed using retted coconut pith as biocarrier and coir fibre as bulking agent.

Still another object of this invention to provide a biofilter process for deodourisation of air which is able to sustain activity for a long duration without compaction, ageing and pressure build-up. This object is achieved by passing contaminated air through a bed comprising retted coconut pith and if required, coir fibre, the bed providing support for microbial cultures.

SUMMARY OF THE INVENTION

Accordingly the present invention relates to a biological filter for the purification of waste gases, comprising a bed of biologically active carrier material consisting of pith extracted from coconut husks, the said bed contained such that the waste gases may be bought in contact with the said bed and removed from the bed at points spatially separated from the inlet points.

In one embodiment of the invention, the bed of biological material further comprises fibre, whereby the bed pressure drop during passage of gas is reduced.

In another embodiment of the invention, the bed of biological material further comprises acid neutralizing agents, such as calcium carbonate.

In another embodiment of the invention, the bed further comprises nitrogenous fertilizer materials.

In another embodiment of the invention, the content of the said fibre in the bed is between 0.5 to 20% weight of the moist bed.

In another embodiment of the invention, the bed of biologically active material is arranged as layers of pith extracted from coconut husk and layers of fibre, alternately.

In another embodiment of the invention, the first layer at bottom of the bed of biologically active material is a layer of fibre.

In another embodiment of the invention, the first layer at top of the bed of biologically active material is a layer of fibre.

In a further embodiment of the invention, the proportion of fibre to pith increases from the gas exhaust point to the gas inlet point.

In another embodiment of the invention, layers of fibre are constructed from non-woven fibre mat such as needle felt.

In another embodiment of the invention, the carrier material further contains activated sludge from an effluent treatment facility.

In a further embodiment of the invention, the pith is extracted from coconut husks which have undergone a process of retting.

In another embodiment of the invention, the fibre is coconut fibre.

The invention also relates to a process for the purification of a gaseous streams containing oxygen comprising humidifying the gas, if required, and passing the gas through a bed of coconut pith.

In another embodiment of the invention, the coconut pith is selected from pith extracted from coconut husks which have undergone a retting process during the process of coir manufacture.

In another embodiment of the invention, the bed further comprises fibre, such as coir.

In another embodiment of the invention, the content of fibre is between 1% and 20% the total weight of bed saturated with moisture.

The invention also relates to a process for the removal of hydrogen sulphide from air streams, air stream through a bed of retted coconut pith and coir fiber from an inlet section to an outlet section where the fibre content of the bed is high at the inlet section and low at the outlet section.

BRIEF DESCRIPTION OF THE ACCOMPANYING DRAWINGS

FIG. 4 shows a measure of the pressure drop in one embodiment of the process of the invention. Here a corresponds to pressure drop per meter of as received retted pith; b corresponds to pressure drop per meter of bed with 0.34% fibre weight in wet weight of as-received retted pith; c corresponds to pressure drop per meter of bed with 0.71% fibre weight in wet weight of as-received retted pith; d corresponds to pressure drop per meter of bed with 2.0% fibre weight in wet weight of as-received retted pith; e corresponds to pressure drop per meter of bed with 3.6% fibre weight in wet weight of as-received retted pith.

DETAILED DESCRIPTION OF THE INVENTION

The invention is described in detail showing how these objects are met. Coconut pith is a waste product of the coir manufacturing process, coir being the fibre extracted from coconut husk. Coir producing countries include Sri Lanka, Philippines and India. In Kerala, South India, coir manufacture is a traditional cottage industry. The process used here is unique. Husks from mature coconuts are bundled and immersed in lakes or rivers for a period of 6 to 8 months. The bundles are known as "rets" and the process is called "retting". During retting, fibres are loosened by microbial degradation of the binding substances such as pectins. Fibres are extracted from retted husks either mechanically or by manual hammering to expel the pith, which are soft particles in which the fibres are embedded.

Pith composition is basically lignin (80%) and cellulose. Pith particles size is usually less than 1 mm. Pith from retted husks is a highly stable material with excellent water holding capacity. As removed during the fibre extraction process, pith also contains short coir fibres. The material is available free from extraneous dirt or sand. It has poor nitrogen content, but has potassium, other secondary nutrients and micro-nutrients. However, it has no utility as fertilizer, because of its poor biodegradability and hence has not been applied in agricultural applications. As a result this material is considered a waste and incurs disposal costs. When dry, pith has a very low bulk density of 0.2 kg/l. One interesting property of a pith bed is that water saturation does not result in any compaction of bed, retaining essentially the same volume. The object of operation of filter without formation of shrinkage cracks is thus met. The presence of short fibres enable this resilience and volume retention. In this invention, it is desired to have the same properties, i.e. poor degradability, that make retted coconut pith a waste as regards its use as fertilizer. Hence the object of finding a new application for this waste material is met along with the object of providing a biofilter with long service life.

Retted coconut pith has a large natural population of microbes. It is worthwhile to note more details about the retting process as is the source of the natural microbial population in retted pith. The microbial action is primarily anaerobic, but during various phases in the retting process aerobic action is also evident. Polyphenols are released into the water during retting. This implies that the natural microbial population contains microorganism capable of degrading phenolic compound. Microbial sulphate reducing activity as well as sulphide oxidising activity has been observed in ret piles.

The biofilter carrier is the essence of this invention. It has now been found that retted coconut pith forms an excellent carrier on which desired micro-organisms can be cultivated. Seeding with suitable cultures provides the necessary initial number of organisms that are multiplied during the course of start-up. In particular, it has been found that activated sludge from the effluent treatment of industrial units is an excellent source of start-up seeding culture for the removal of such compounds as toluene. It has also been found, that in the case of cleaning of air containing hydrogen sulphide, pith already contains sufficient number of sulphide removing micro-organisms in its natural state to efficiently oxidise hydrogen sulphide, and no further seeding is required.

Figure 1:
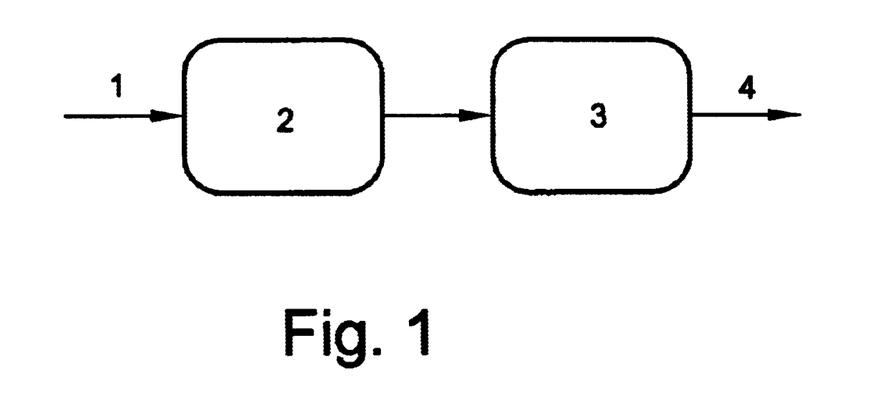
FIG. 1 is a schematic representation of the process of cleaning of contaminated gases where 1 represents a contaminated gas inlet; 2 represents the humidification system; 3 represents the biofilter; and 4 represents a clean gas outlet.
Figure 2:
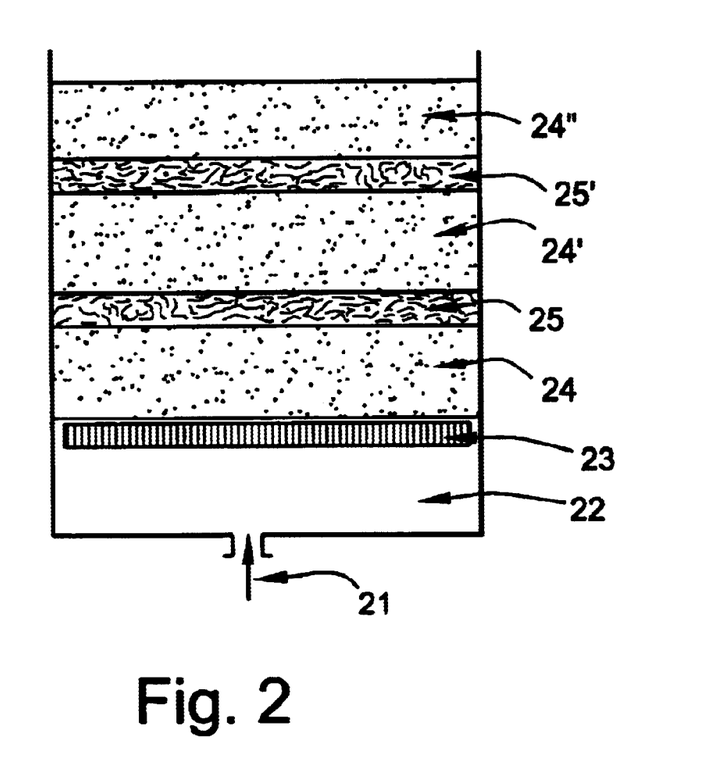
FIG. 2 shows a schematic of a biofilter bed arranged in layers where 21 represents a gas inlet; 22 represents a gas plenum; 23 represents a perforated sheet support for the bed; 24' and 24" represent layers of pith and fibre mixture and 25 and 25' represent layers of fibre.
Figure 3:
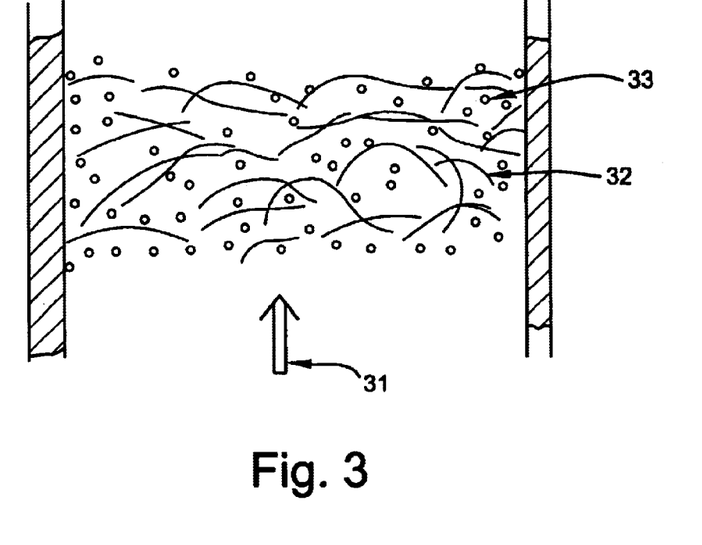
FIG. 3 shows an enlarged view sketch of the biofilter bed where 31 shows the direction of the gas flow, 32 represents pith and 33 represent fibre mixed into the bed. It shows how the fibers are generally in fallen down orientation rather than in upright orientation.
Figure 4:
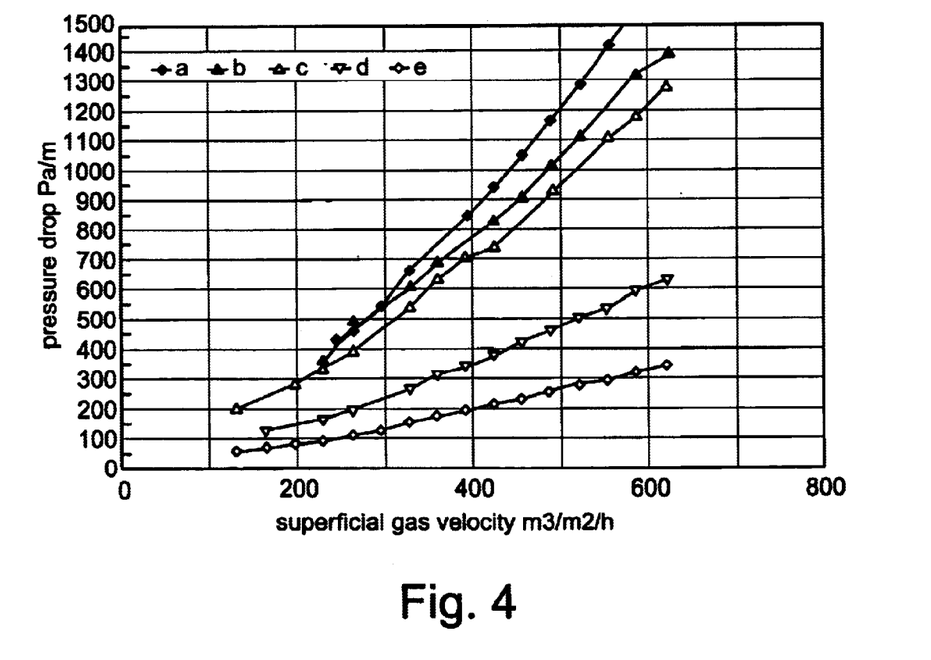
Figure 5:
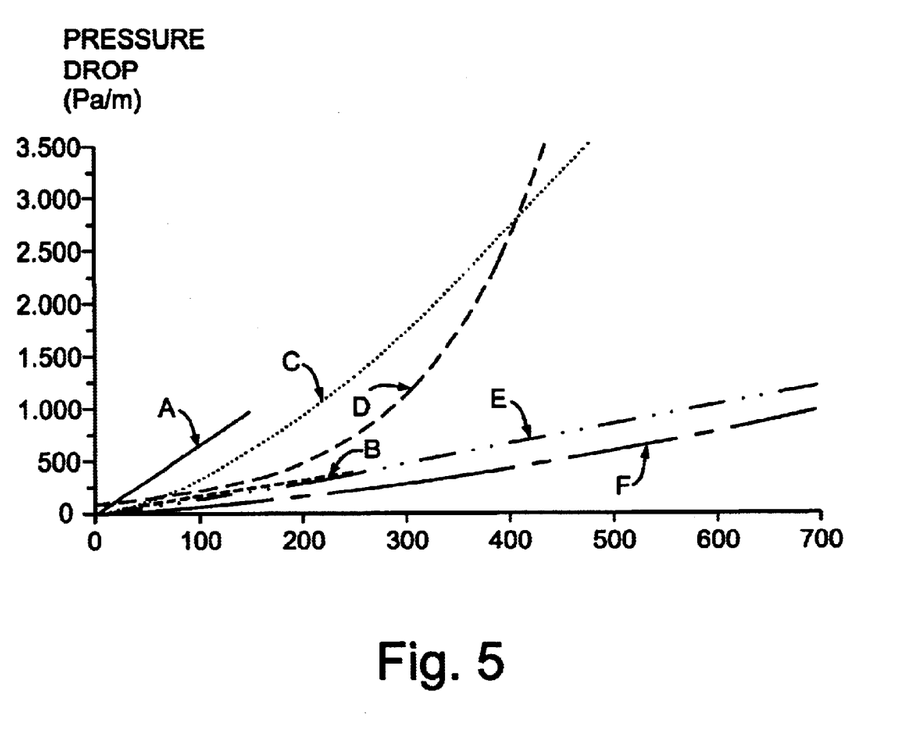
FIG. 5 is adapted from U.S. Pat. No. 5,578,114 wherein the pressure drop is shown as function of the surface load $(m^3/m:h)$ for a number of different filter materials applied, to wit A compost of household wastes; B tree-bark compost (coarse); C compost/sintered clay granules (60:40); D compost of household wastes with wood chipping; E compost! polystyrene (50:50); F the filter material comprising pelletised compost as per U.S. Pat. No. 5,578,114.
Figure 6:
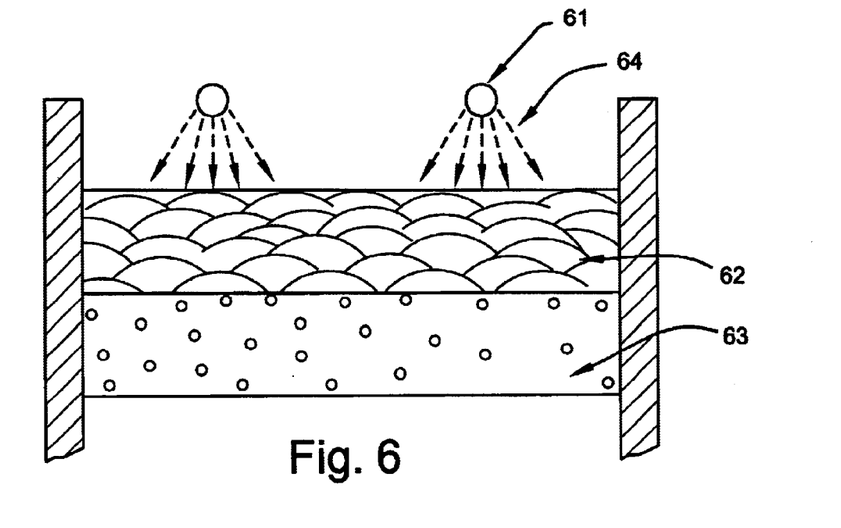
FIG. 6 shows a layer of fibre 62 as the top layer of the biofilter bed and humidifying spray 64 from spray nozzles 61 impacting on fibre layer 62 preventing deformation of active bed 63.
Figure 7:
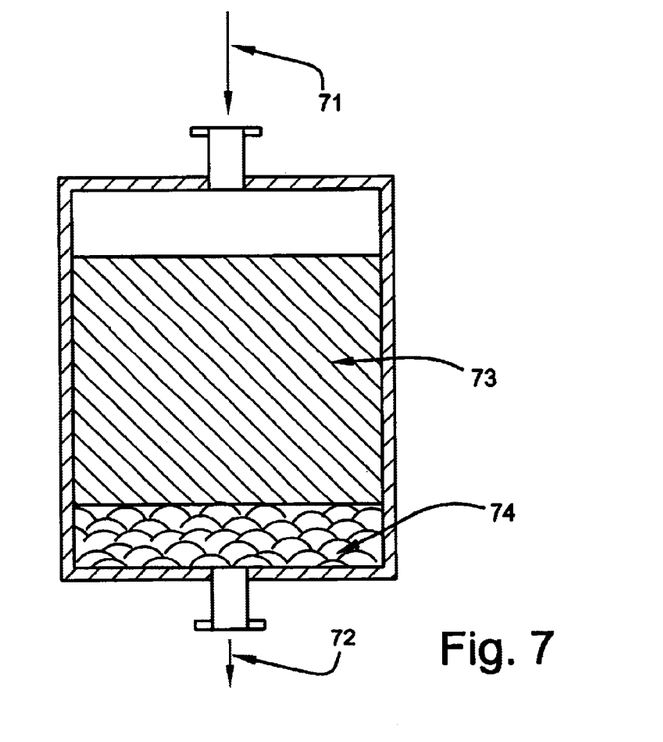
FIG. 7 shows a downflow biofilter using a fibre layer 73 for support of bed 73 and withdrawal of gas, instead of a perforated sheet above a gas plenum. Reference numeral 71 shows gas inflow and 72 shows the gas outflow.

It has been found that gas can be passed through mixture of pith and fibre at high rates with very low pressure drop. It has also been found that pressure drop may be suitably modified by varying the proportion of pith and fibre in the bed. Further, it has also been found that even at high gas flow rate, there is intimate contact with the filter bed to effectively transfer gas components to the active particles. FIG. 4 shows the pressure drop per meter of bed at superficial gas velocity ranging from 100 to 600 $m^3/nr/h$. FIG. 5, freely adapted from U.S. Pat. No. 5,578,114, shows, in comparison, various other materials. At the highest superficial gas velocity of 600 $m^3/m^2/h$, the pressure drop in the invention is 320 Pa/m whereas prior art best performance solely in term of pressure drop is shown with granulated compost, at 620 Pa/m. This is achieved in this invention without sacrificing gas contact with interior surfaces of the carrier, unlike in the case of granulated compost. Hence the object of low pressure drop without loss of elimination capacity is met.

It has been found that the—presence of fibre in pith, which can, if required be increased by simply mixing in more coir fibres, in addition to increasing its porosity, gives the bed resilience against compaction, so much so, that change of moisture content does not result in bed volume change. This property is utilised, in this invention, to prevent lump formation, shrink cracking or ageing of bed.

The use of fibre as a bulking agent in this invention is a significant innovation in biofilter contraction. Fibre is able to provide body to the bed even while the volume fraction of pith to fibre is retained high. This is because, fibre, particularly a strong and resilient fibre such as coconut coir fibre, is able to sweep out a volume much larger than the intrinsic volume of the fibre. In contrast, the use of shape retaining materials such as polystyrene balls, requires a much larger volume fraction of bed to be occupied by the bulking agent. For comparison, EP142872 mentions that a pressure drop of 8 mm water is achieved by using 50% to 60% volume of polyethylene particles mixed with compost, at a superficial gas velocity of 200 $m^3/n2/h$. At the same superficial gas velocity, this invention has a pressure drop of 7 mm water when a mere 3.6% by weight of fibre to wet weight of retted pith is mixed into the pith bed. There is little meaning is denoting volume of fibre added, since fibre, being a flexible material, the volume depends on the degree of compaction of the fibre bale.

Coir fiber is a very stable and strong natural fibre. It has been used for matting, carpets and rope making for centuries. The fibre, spun into ropes has also been used traditionally for ship docking operations and for jointing of planks in wooden boats (including ocean going). These examples demonstrate the strength of the fibre even when soaked. In recent years, coil fibre has been used to manufacture geofabrics for stabilisation of loose soil. These examples are given to demonstrate the resistance of this fibre to degradation under severe environmental conditions. These properties are utilised in this invention, to maintain bed physical properties over long duration.

Coconut pith and coir fibre are perfectly from the same source i.e. coconut husk. In fact, during the manufacture process, only long fibre is extracted and the pith short fibres. In this invention, further addition of fibre is given, when required to improve gas permeation. It was found in close examination of a well mixed pith and fibre media freely dumped into a container to form a bed, that the fibres are in generally fallen down orientation rather than upright orientation. Thus the bed has higher permeability in the horizontal directions than in the vertical directions. This is particularly useful since it ensures good gas contact distribution along horizontal planes while preventing gas short-circuiting through vertical paths. The particle size of pith, fibre diameter, shape and surface properties of both materials enable close binding of pith to fibre, thus resisting separation of composite bed into its components, even during watering.

The process disclosed in this invention, comprises mixing pith from retted coconut husk and coconut coir fibre, with, if required, alkaline earth materials, nitrogenous fertilizers and bacterial cultures, forming a bed of the composite material, and passing waste gases containing oxygen and humidity, through the bed whereby odour and volatile organic compounds in the waste gas are removed.

Various embodiments of the biofilter may be realised for the process of this invention. The preferred embodiments and their utility are described herein.

1. A bed comprising pith and fibre where the proportion of fibre to pith along the depth of the bed does not change. This is the simplest realisation of this invention, and it may be generally applied in all situations.
2. A bed comprising pith and fibre where the proportion of fibre to pith increases along the bed from the gas outlet end to the gas inlet end. This biofilter arrangement is particularly situated to removal of hydrogen sulphide from air. During the passage of hydrogen biofilter, it is oxidised to sulphur, which being a solid tends to clog the biofilter, particularly at the gas inlet end when the concentration of hydrogen sulphide is somewhat high. The arrangement of pith and fibre as described here provides large porosity or air volume at the inlet end and therefore effectively prevent pressure drop increase. At the same time, the comparatively close packing at the gas outlet end enables good mass transfer and reaction for the removal of traces of hydrogen sulphide from the exiting air stream.
3. A bed comprising pith and fibre arranged in alternating layers of pith fibre mixture followed by fibre along. This arrangement gives spatial separation of the biofilter into various active layers separated by inactive fibre layer. Distinctive reactions may be activated in the active layers with different microbial cultures, or by admixture of buffering agents, acid neutralizing agents or nutrients as required for the desired reaction in the layer. This arrangement is particularly useful in the cleaning of gas mixtures.
4. A bed comprising pith and fibre arranged so that the topmost layer comprising fibre alone. This arrangement is useful in break up of water or other liquid sprays and prevents the impact of droplets on the soft bed.
5. A biofilter bed comprising pith and fibre arranged so that the bottommost layer comprises fibre alone. This arrangement is useful in even distribution of gas and support of the active media without the need for a gas plenum chamber and perforated sheet support for the bed, when the biofilter is operated in the upward gas flow mode. This arrangement will work equally well for removal of gas from the biofilter again without a gas plenum chamber and when the biofilter is operated in the downward gas flow mode.
6. The above arrangements may obviously be used in combination also.
7. The fibre layer as required in the above embodiments may be constructed from non-woven coir fibre mat.

The invention will now be illustrated by the following examples. These examples are by way of illustration and should not be construed to limit the scope of the invention.

EXAMPLE 1

A biofilter comprising a cylindrical tube of diameter 50 mm coconut pith in 4 layers with coir fibre separating the layers. The total height separating fibre layers is 1 m. Moist air containing hydrogen sulphide was introduced at the bottom of the biofilter. This contaminated air was produced as follows. Ai containing acidified sodium sulphide solution where the continuous liquid feeding. Various concentrations of hydrogen changing the concentration of sodium sulphide in the liquid feed, sulphide was measured by iodometric titration of gas samples for concentrations volume/volume and by using as portable gas sensor (Quest Model Safecheck) for concentration in the range of 1 to 500 ppm volume/volume. The below gives the performance of the biofilter at various hydrogen sulphide loading rates.

| No. | Superficial gas velocity m/h | Inlet gas concentration in ppm volume/volume | Outlet gas Concentration in ppm volume/volume | Removal efficiency % | Elimination capacity grams $H_2S$ per $m^3$ of biofilter media per hour | Pressure drop in mm of water |
| --- | --- | --- | --- | --- | --- | --- |
| 1 | 23.4 | 637 | less than 1 | 100 | 24 | 4 |
| 2 | 23.8 | 1,474 | less than 1 | 100 | 56 | 4 |
| 3 | 24.1 | 2,249 | less than 1 | 100 | 85 | 12 |
| 4 | 24.1 | 3,386 | less than 1 | 100 | 128 | 12 |

The elimination capacity of the filter is defined as the weight of contaminant (here—hydrogen sulphide) removed per unit volume of biofilter per hour. The above example shows high efficiency of removal and very high elimination capacity of the biofilter media as per this invention. The biofilter was operated for a period exceeding six months. During this period the pressure drop did not increase more than 8 mm of water demonstrating the use of fibre as per this invention to decrease the pressure drop as well as to provide air volume which can be filled with sulphur.

EXAMPLE 2

A biofilter comprising a cylindrical tube of diameter 50 mm was filled with a mixture of retted coconut pith, coir fibre, diammonium phosphate and activated sludge from an industrial was mixed with a additional air stream plant. The total height of the bed in the tube was 1 m, Moist air was mixed with an additional air stream bubbled through a bottle containing toluene. The air mixture was fed to the bottom of the biofilter tube and removed from the top of the bed. The bottle of toluene was weighed every day to find out the amount of toluene vaporized and mixed with the air stream. Samples of air from the inlet of the biofilter bed, at the outlet of the bed and at various sampling points along the length of the bed were analysed using chromatograph with a flame ionization detector and date recorder-integrator. The biofilter was operated for a period of 4 months. The table below shows the removal of toluene in the biofilter (steady state values).

| No. | Superficial gas velocity m/h | Inlet gas concentration in ppm volume/ volume | Outlet gas concentration in ppm volume/ | Removal efficiency % | Elimination capacity gram toluene per m³ of biofilter media per hour |
|---|---|---|---|---|---|
| 1 | 24.4 | 749 | 7.09 | 98 | 78.4 |
| 2 | 36.7 | 506 | 3.85 | 09 | 80 |
| 3 | 45.8 | 428 | Less than 1 | 100 | 84 |

The above examples show the very high efficiency and high elimination capacity of the biofilter as per this invention.

There are several advantages for the present invention over the prior art.

1. The use of coconut pith and coconut coir fibre for formulation of the biofilter bed allows tighter control of design of the system as important characteristics such as water holding capacity and pressure drop of the system can be adjusted over a wide range.
2. The biofilter has longer operation period before compaction occurs because the ingredients viz, retted coconut pith and coconut fibre are extremely stable biomaterials having undergone an immersion retting process for a period of at least six months.
3. A large change in pressure drop and a large change in air volume of the biofilter bed may be effected by a small change in proportion of fibre to pith. This enables the process to be used in, for example purification of waste gas streams containing—hydrogen conventional compost filter.
4. The biofilter bed as per this invention has excellent drainage characteristics and does not allow the collection of free pools has greater resistance to breakdown as a result of drying because of the greater water holding capacity in biofilter.
5. The process has greater resistance to breakdown as a result of drying because of the greater water holding capacity in biofilter.
6. The process is environmentally friendly and attractive as it makes use of renewable materials and in particular, a material—retted coconut pith—which is at present a waste material.
7. The ingredients used in this process are resilient when compacted for transportation and may be reconstituted and reformulated using the two ingredients to required volume weight and air volume, thus reducing transportation costs.
8. This process does not result in organic contaminated or coloured leachates again because of the stable nature of the materials used.
9. The bed may be constructed in spatially separated active layers, the separation achieved using fibre.
10. The bed may be constructed using a fibre layer to support the bed and distribute the gas, thus simplifying construction and reducing cost.

We claim:

1. A biological filter for the purification of waste gases, comprising a housing with at least one inlet and at least one outlet, and a bed of active micro-organisms contained in a carrier material consisting of pith extracted from coconut husks, the carrier material being provided in the housing such that the waste gases flowing in through the at least one inlet contact the bed of carrier material before exiting through the at least one outlet.

2. A biological filter as claimed in claim 1, wherein the bed of carrier material further comprises fibre to provide the bed with additional porosity allowing passage of gas with lower loss of pressure during passage.

3. A biological filter as claimed in claim 1 wherein the bed of biological material further comprises an acid neutralizing agent.

4. A biological filter as claimed in claim 3 wherein the acid neutralizing agent is calcium carbonate.

5. A biological filter as claimed in claim 1 wherein the bed further comprises a nitrogenous fertilizer material.

6. A biological filter as claimed in claim 2 wherein the content of the fibre in the bed is between 0.5 to 20% weight of the moist bed.

7. A biological filter as claimed in claim 2 wherein the bed of biologically active material is arranged as alternate layers of pith extracted from coconut husk and layers of fibre.

8. A biological filter as claimed in claim 7 wherein the in the alternate layers of fibre and coconut pith, the first layer at bottom of the bed is a layer of fibre.

9. A biological filter as claimed in claim 7 wherein in the alternate layers of fibre and pith the first layer at top of the bed is a layer of fibre.

10. A biological filter as claimed in claim 2 wherein the proportion of fibre to pith increases from the at least one outlet to the at least one inlet.

11. A biological filter as claimed in claim 7 wherein the said layers of fibre are constructed from non-woven fibre mat such as needle felt.

12. A biological filter as claimed in claim 1 wherein the said carrier material further contains activated sludge from an effluent treatment facility.

13. A biological filter as claimed in claim 1 wherein the said pith is extracted from coconut husks, which have undergone a retting process.

14. A biological filter as claimed in claim 2 wherein the fibre is coconut fibre.

15. A process for the purification of a gaseous stream containing oxygen comprising humidifying the gas, if required, and passing the gas through a bed of coconut pith.

16. A process as claimed in claim 15 wherein the coconut pith is selected from pith extracted from coconut husks which have undergone a retting process during a coir manufacture process.

17. A process as claimed in claim 16 wherein the bed further comprises fibre.

18. A process as claimed in claim 17 wherein the said fibre is coir.

19. A process as claimed in claim 17 wherein the content of fibre is between 1% and 20% the total weight of bed saturated with moisture.

20. A process for the removal of hydrogen sulphide from an air stream, comprising passing the air stream through a bed of retted coconut pith and coir fiber from an inlet section to an outlet section where the fibre content of the bed is high at the inlet section and low at the outlet section.

* * * * *